US006635297B2

(12) United States Patent
Moss et al.

(10) Patent No.: US 6,635,297 B2
(45) Date of Patent: Oct. 21, 2003

(54) SYSTEM AND PROCESS FOR PRODUCING ANIMAL FEED FROM FOOD WASTE

(75) Inventors: William H. Moss, Coral Springs, FL (US); David V. Marple, Coral Springs, FL (US); Mark Y. Kigel, East Brunswick, NJ (US)

(73) Assignee: NutraCycle LLC, Boca Raton, FL (US)

( * ) Notice: Subject to any disclaimer, the term of this patent is extended or adjusted under 35 U.S.C. 154(b) by 27 days.

(21) Appl. No.: 09/981,261

(22) Filed: Oct. 16, 2001

(65) Prior Publication Data

US 2003/0072861 A1 Apr. 17, 2003

(51) Int. Cl.[7] .............................. A23K 1/10; C02F 1/52; C02F 1/56
(52) U.S. Cl. ....................... 426/531; 426/623; 426/630; 426/635; 426/807
(58) Field of Search ................................. 426/531, 623, 426/630, 635, 807

(56) References Cited

U.S. PATENT DOCUMENTS

| | | | | |
|---|---|---|---|---|
| 4,173,532 A | * | 11/1979 | Keoteklian | 210/49 |
| 4,728,517 A | | 3/1988 | Markham et al. | 426/53 |
| 4,933,087 A | * | 6/1990 | Markham, Jr. et al. | 210/626 |
| 5,433,863 A | * | 7/1995 | Braden et al. | 210/708 |
| 5,543,058 A | * | 8/1996 | Miller | 210/725 |
| 5,596,815 A | | 1/1997 | Rice et al. | 34/346 |
| 5,759,568 A | | 6/1998 | Mosely, Sr. | 424/442 |
| 5,891,254 A | | 4/1999 | Coville et al. | 127/48 |
| 5,908,634 A | | 6/1999 | Kemp et al. | 424/442 |
| 5,955,023 A | | 9/1999 | Ioffe et al. | 264/463 |
| 5,958,233 A | * | 9/1999 | Willgohs | 210/259 |
| 5,976,594 A | | 11/1999 | LaFollette | 426/285 |
| 6,030,565 A | | 2/2000 | Golan | 264/117 |
| 6,106,673 A | | 8/2000 | Walker | 203/22 |
| 6,132,625 A | | 10/2000 | Moffett | 210/727 |
| 6,194,065 B1 | | 2/2001 | Golan | 428/359 |
| 6,372,145 B1 | * | 4/2002 | Tarbet et al. | 210/710 |

FOREIGN PATENT DOCUMENTS

ES  2152810  * 9/2001

\* cited by examiner

*Primary Examiner*—Chhaya Sayala
(74) *Attorney, Agent, or Firm*—Duane Morris LLP

(57) ABSTRACT

A process is provided for producing animal feed from food waste by providing a dry, pelletized, fibrous organic material. Specifically, the invention relates to methods of thickening/dewatering solids that contain substantial amounts of moisture, e.g., ground food waste.

14 Claims, 1 Drawing Sheet

SYSTEM AND PROCESS FOR PRODUCING ANIMAL FEED FROM FOOD WASTE

The present invention relates to methods of producing animal feed from food waste by providing a dry, pelletized, fibrous organic material. Specifically, the invention relates to methods of thickening/dewatering solids that contain substantial amounts of moisture, e.g. ground food waste. More particularly, the invention relates to methods for thickening ground food waste as a water based slurry utilizing synthetic organic flocculants usable as animal feed additives. The invention also relates to methods of treatment of the separated liquid phase (supernatant or filtrate) resulting from thickening water based slurries.

BACKGROUND OF THE INVENTION

It is known in the art that an extrusion process that is a part of the food waste pelletization and drying technology cannot be provided when the liquid-solids admixture contains substantial amounts of liquid, e.g. water. U.S. Pat. No. 5,596,815 (Rice et al.) describes a method for moisture reduction by adding a dry material. This dry material adds to the cost of the process.

U.S. Pat. No. 5,908,634 presents an animal feed in powder or granular form containing molasses and 10 to 60% of bentonite and zeolite, which is added as a dehydrating agent, and causes the delayed release of nitrogen. Hydrated lime may be added as a source of calcium, to improve pellet quality. The addition of bentonite and zeolite as dehydrating agents require curing times of up to 12 hours, which is a drawback of the invention. Also, addition of the dehydrating agent in amounts of up to 60% diminishes the nutrient value of the animal feed.

U.S. Pat. No. 5,955,023 describes a method of forming a composite particle product from lignin-cellulose material bonded together with water insoluble lignin (2–40% by weight) and a binding agent. The mixture is then heated and compressed to promote bending and cross-linking between the lignin binder and the lignin-cellulose material. Lignin functions as the primary adhesive for the product, and forming the particleboard product from the lignin bonding mixture. The drawback of the method is a necessity to use heat (between 100 and 240° C. for 1 to 60 seconds) to bind lignin with the cellulose material. Also, the initial lignin-cellulose material has to have a moisture content of about 30% or less, and water-insoluble lignin has to be dissolved in an organic solvent and then be evaporated.

U.S. Pat. No. 5,958,233 reveals a process and apparatus for dewatering aqueous solids residual after fermentation and distillation, such as corn stillage. The feed stream of aqueous solids slurry is fractionated into two or more sub-streams in such a way that one of the sub-streams contains predominately heavy particulate solids and has substantially improved free-draining characteristics. A second sub-stream contains lighter particles, entrained fines of the heavy particles, and a major portion of the liquid from the feed stream. The free-draining sub-stream is dewatered using a device such as a screen centrifuge or a screw press, both of which produce a cake of relatively high solids content. The remaining liquid from the feed stream is concentrated in an evaporator, before being mixed with the dewatered solids, which may be dried to produce an animal feed. The drawback of the process is the loss of nutrients in the second sub-stream containing lighter particles to be potential animal feed unless the second sub-stream containing lighter particles along with the liquid phase separated from the free-draining sub-stream are evaporated; evaporation of the liquid phases is not economical. Another drawback of the process is that it is limited to a fat free material, such as corn stillage, and the method of dewatering of the free-draining sub-stream cannot be used for a material rich in fat unless the free-draining characteristics are substantially improved.

U.S. Pat. No. 5,976,594 discusses a process for turning food waste into animal feed including agitating the ground food waste in a blending tank so that the food waste is suspended. A production system includes a series of pipes and tanks through which food waste is processed and dehydrated so that the food waste is ultimately converted into animal feed. Dry feed stock is added as dehydrated material, and the mixture is then converted into moist pellets that are then dried and packaged for further distribution. The shortcoming of the process is inadequate dewatering of the food waste, resulting in large amounts of dehydrating agent added, which makes the animal feed not economical.

U.S. Pat. Nos. 6,030,565 and No. 6,194,065 describe an agglomerate and a process for its manufacture by providing a dry, particulated, fibrous organic material that is mixed with a powdered mineral, thus resulting in the first mixture. A binding agent is added to the first mixture, in order to obtain a second mixture. The agglomeration of the second mixture in an agglomeration dish and drying the agglomerate results in a desired dried state. The drawbacks of the process are that processing the fibrous organic material in a heated screw press, as well as the addition of a binding agent, add to the cost of the final product. Also, the agglomeration process requires the addition of a binding agent from the group consisting of chemical adhesives, resins and starches, and these materials are not considered animal feed.

U.S. Pat. No. 6,106,673 provides a process and system for the separation of a fermentation process by-product into its constituent components. The process requires heating of a mixture containing the by-product to separate the oil from a base component of the by-product. Oil separation is followed by recovering the base product, the oil, and, possibly, other substances such as molasses from the mixture by evaporation (at a temperature between 140° F. to 250° F.). The drawback of that process is excess energy consumption.

U.S. Pat. No. 6,132,625 provides a method that can be used to clarify substantially aqueous streams and optionally separate biosolids, especially proteins, from food processing operations. The method comprises the contact of an aqueous stream comprising biosolids with an anionic, inorganic, colloidal material selected from the group of polysilicate microgels, and an organic polymer (two cationic flocculants with a low and high molecular weight), to flocculate the biosolids. A process is provided which can be used to clarify substantially aqueous streams and optionally separate biosolids, especially proteins, from food processing operations, which comprises contacting an aqueous stream comprising biosolids with an anionic inorganic colloid and an organic polymer, to flocculate the biosolids. A drawback of the invention is that it is limited to a substantially aqueous stream containing biosolids, especially protein. A quality animal feed will also contain fats in an optimum ratio to proteins. If such an aqueous stream is separated from the food waste, it may contain highly concentrated and hardly treatable organic material that could not be treated using only the synthetic organic flocculants.

U.S. Pat. No. 5,891,254 describes a method for purifying an aqueous sugar solution by a hydrolyzed polyacrylamide. The invention describes clarification of sugar juice, related to the treatment of the supernatant in the process modification described above. This reference considers sludge to be a disposable residue, while the clear juice is the ultimate product. The polymer binding solids is removed with waste sludge, and its effect on the final product (sugar juice) is negligible. The major drawback of the invention is that it is limited to sugar juice production, and the sludge, when considered an animal feed, is processed to provide a necessary fat-to-protein ratio that is not a subject of the patent. Another drawback of the invention is that it is limited to a relatively clear liquid, such as sugar juice containing primarily carbohydrates. Such a liquid is treated with a hydrolyzed polymer, and the method cannot be used for treating fat and protein contaminated liquid unless an organic material destruction process is implemented.

U.S. Pat. No. 5,759,568 describes a method for producing animal foodstuff from waste, and is based on addition of bentonite and a polymer to the waste stream. The reference describes the flow subject to treatment as a combination of, at least, three aqueous streams, so that the final stream can be very diluted. This is confirmed by the use of a flotation method for solids-water separation, resulting in the discharge of the effluent to the sewer system. A substantial drawback of the invention is that the flotation process results in separated solids containing abundant moisture, and the effluent containing residual suspended solids. The reference does not disclose destruction of highly concentrated organic material resulting from separation of the solid containing both the fats and the proteins, so it is limited to the diluted streams. The reference assumes the use of filter presses (belt presses) for sludge dewatering that significantly adds to the cost of the process. Nonetheless, the filtrate will contain abundant residual dissolved and colloidal organic material that has to be separated and treated using a combination of the destruction and separation methods.

U.S. Pat. No. 6,132,625 assumes the use of a combination of inorganic and organic coagulation-flocculation means for phase separation. The use of inorganic coagulants makes the ultimate product unusable as an animal food additive, resulting in the invention being not applicable for the purpose of making animal feed from the food wastes.

U.S. Pat. No. 4,728,517 assumes production of animal feed from float sludge and from activated sludge. Bulking agents, e.g. wood chips and the like, added to remove fats as well as coagulation and flocculation agents are considered components of ultimate animal food. In this reference, the liquid phase (supernatant) is not removed from the system and is added to the batch. Thus, that liquid is evaporated, thereby inefficiently consuming substantial amounts of energy.

SUMMARY OF THE INVENTION

It is an object of the present invention to provide a continuous process comprising shredding food waste containing fats without fat emulsification, followed by thickening of shredded (ground) food waste using an appropriate synthetic organic flocculant approved as an animal feed additive. The thickened food waste is preferably a low moisture product subject to extruding (pelletization) followed by pellet excess liquid evaporation. The liquid phase separated in the thickening process is then treated, thus providing a high purity final effluent usable for recycling, and excess sludge usable as animal feed additive.

A further object of the present invention is to provide a continuous process of mixing the ground food waste with an appropriate synthetic organic flocculant, followed by thickening.

A further object of the present invention is to provide a process for treatment of the liquid phase resulting from the thickening process by a combination of the appropriate phase separation processes and destruction and/or adsorption of the organic material.

In accordance with the above-noted objectives, the present invention is a system and process for producing animal feed from food waste comprising shredding (grinding) of the food waste, followed by thickening of ground food waste using an appropriate synthetic organic flocculant approved for animal food additives, thus resulting in a low moisture product, and treating the liquid phase by a method and apparatus providing high purity final effluent and excess sludge usable as animal food additive.

DESCRIPTION OF THE PREFERRED EMBODIMENTS

Figure 1:
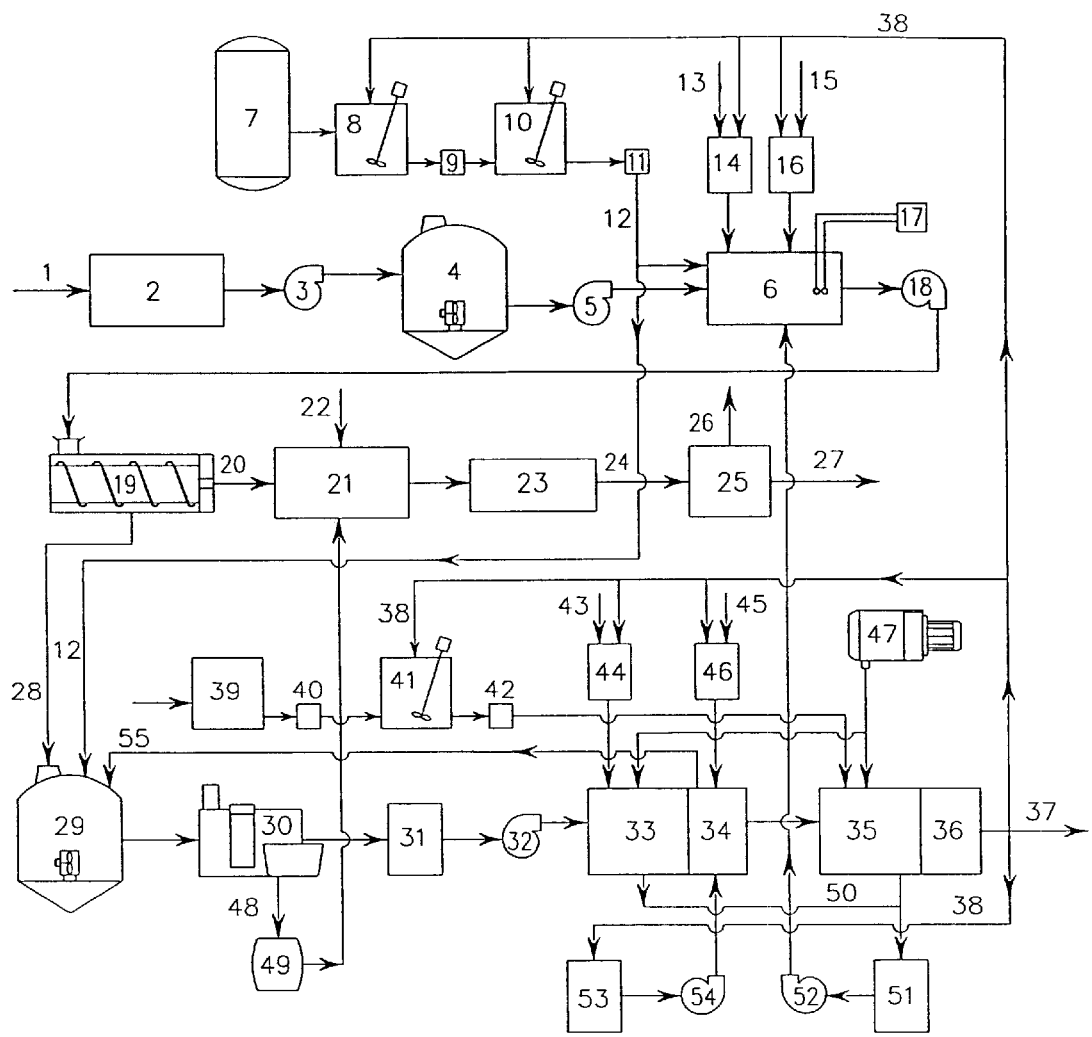
FIG. 1 is a diagram of the sequential steps of the basic process of this invention.

A basic process of the invention is described as it relates to the processing of food waste. Raw food waste 1 from a receiving pit is conveyed to shredder 2 where it is ground to the size of about ¼ inch (6 mm) or less to provide sufficient contact area for subsequent processing. Ground waste is introduced by positive displacement, preferably, plunger pump 3 to equalization tank 4 equipped with a submersible mixer, preferably, a propeller mixer. The equalization tank can be either cylindrical (with flat or conical bottom), rectangular or of any other shape providing uniform mixing throughout the tank volume. A positive displacement, preferably, plunger pump 5, conveys the equalized raw food waste to mixer 6. Agglomerating polymer 13, preferably, a synthetic organic cationic polyamine or polyDADMAC flocculant GRAS (generally recognized as safe) series diluted to an effective concentration (e.g., from about 2.5 to 4.0 kg per dry ton of waste, preferably, from about 2.9 to 3.2 kg/ton) in the solution preparation, and dosing unit 14 is introduced to mixer 6 in order to provide initial floc agglomeration. Hydrated lime stored in silo 7 is diluted to about 30% concentration in holding tank 8; then by dosing pump 9, it is introduced to mud tank 10. In tank 10 hydrated lime is diluted to about a 5% concentration lime slurry, and the lime slurry is introduced by pump 11, via feeding line 12, into mixer 6 for maintaining optimum pH level, preferably, ranging from pH 8.0 to pH 9.0 maintained by a pH control device 17. Bentonite is later introduced to mud tank 10 simultaneously with lime, in order to provide faster and larger floc formation.

An anionic flocculant 15, preferably, a high molecular weight (e.g., from about 8–20 million, about 12–14 million preferred) polyacrylamide GRAS series, is diluted to an effective concentration (generally about 5 to 10 times less than the dosage of the cationic agglomerating polymer, preferably about 6 to 7 times less) in the solution preparation and dosing unit 16 is introduced to mixer 6 in order to provide floc formation, thus releasing free water (liquid phase) from the agglomerates. Mixer 6 operates as a batch reactor. Hydrated lime slurry is introduced simultaneously with the raw food waste; after 5–7 minutes of mixing, the agglomerating polymer is introduced into the mixer, then the anionic flocculant is introduced to the mixer following the agglomerating polymer, with an interval of about 7–12 minutes. The agglomeration and flocculation reactions proceed within a residence time of 0.5 to 1.0 hours. The process induced in mixer 6 is a food waste conditioning process. The conditioned food waste is conveyed by a positive displacement pump 18 to thickener 19, where phase separation occurs. Liquid phase 28 screened from the conditioned food waste and containing dissolved and colloidal matter, as well as tiny suspended solids is conveyed to a separate treatment train, while solid phase 20, which is thickened food waste, is conveyed to solid phase mixer 21. A dry carrier 22, e.g., millfeed (wheat midds), granulated cookie or other bakery products as a corrective agent is introduced to mixer 21 for maintaining solid phase moisture, preferably no higher than about 50%. Fat removed in the liquid phase treatment train is discharged to mixer 21 for balancing the appropriate fat-to-protein ratio. Mixer 21 is considered a solid phase conditioning reactor. The conditioned solid phase is conveyed to pelletizer 23 where wet solid phase pellets are formed by extruding. The wet solid phase pellets 24 are then conveyed to dryer 25, where water 26 is evaporated, and dry final product 27 as animal feed is distributed to the customers.

The liquid phase treatment train starts from liquid phase equalization and holding tank 29 equipped with a submersible mixer, preferably a propeller mixer. The liquid phase equalization tank prevents undesirable premature phase separation, and it can be either cylindrical (with flat or conical bottom), rectangular, or of any other shape providing uniform mixing throughout the tank volume. The equalized liquid phase flow enters grease and fat recovery system 30 from which removed fat 48 is collected in a drum or container 49, while the fat free liquid is directed to a chemical oxidation reactor 31. For chemical oxidation of the dissolved and colloidal organic material contained in the liquid phase, any strong oxidizer such as either hydrogen peroxide, ozone, or chlorine dioxide, or a combination of one of them with ultraviolet radiation can be used. Pump 32 delivers liquid flow containing the oxidized organic material to physical-chemical treatment. A physical-chemical reactor including two or more compartments 33 and 34 arranged in series is used for providing flocculation of the oxidized particles using a combination of cationic and anionic flocculants 43 and 45 in solution, prepared in corresponding units 44 and 46 and introduced, correspondingly, in said compartments. Compartments 33 and 34 can be either complete mixing reactors or contact flocculation reactors as filters with the fixed or moving granular beds. In order to obtain high purity liquid phase treated effluent, carbon adsorption reactor 35 and/or ion exchange reactor 36 follow the physical-chemical treatment reactor. Eventually, reactors 35 and 36 can be two-stage ion exchange reactors for subsequent removal of hardness and ammonia. Alternatively, the contact flocculation process can be implemented in two stages with the upward stream filtration in the first stage (33 and 34), and the downward stream filtration in the second stage (35 and 36). For the air-and-water backwash of the contact flocculation filters, air compressor 47 is used, as well as final treated effluent 37 as process water 38 for preparation of all reagent solutions. Process water 38 is stored in tank 53, and with pump 54 is used for filter backwash. Filter backwash dirty water 50 is collected in tank 51, then by pump 52 is conveyed to mixer 6. If reactor 35 is an ion exchange reactor, a solution of acid or salt 39 is prepared in tank 41 equipped with a feeder 40 and dosing pump 42. Wastewater resulting from ion exchange material regeneration is, alternatively, collected in tank 51 and discharged into mixer 6 for neutralization.

The following example illustrates the effectiveness of the system and process of the present invention. The outcomes were based on the results of a bench-scale test of the process of the present invention. The method was used for processing 100 tons per day of food waste into animal feed. This example is compared with that by U.S. Pat. No. 5,596,815, herein incorporated by reference. The comparison is illustrated in Table 1.

TABLE 1

| Points of the Process Flow Diagram | Mass of material | | | | | |
|---|---|---|---|---|---|---|
| | By Inventive System and Process | | | By U.S. Pat. No. 5,596,815 | | |
| | Tons of solids | Tons of water | % moisture | Tons of solids | Tons of water | % moisture |
| Inlet (raw food waste | 26 | 74 | 74 | 26 | 74 | 74 |
| Mixer (the second mixer by inventive method and the only mixer by the prototype) | 26 | 38 | 60 | 116 | 84 | 42 |
| Pelletizer | 32 | 38 | 54.3 | 116 | 84 | 42 |
| Outlet    Vapor | — | 33 | — | — | 68 | — |
| Product | 32 | 5 | 13.5 | 116 | 16 | 12.1 |

As noted above, moisture of the raw food waste was decreased from 74% to 60% by removing 36 tons of water with a screw press, using pH adjustment followed by addition of bentonite and by introduction of an appropriate flocculation means proven for animal food additives. A further decrease in moisture was provided by adding 6 tons of dry carriers. In contrast, the decrease in moisture of raw food waste from 74% to 42% by U.S. Pat. No. 5,596,815 was provided by adding 100 tons of dry carriers. The decrease in waste food moisture to approximately 45–55% is necessary for following efficient pelletization. Thermal drying of the pelletized product in order to obtain moisture of the final product of 12–13.5% is a costly and energy consuming process. The amount of water to be evaporated by the inventive method was 33 tons, while that by U.S. Pat. No. 5,596,815 is 68 tons.

In further experiments, a pilot-scale test using industrial size dewatering equipment—a screw press furnished with corresponding auxiliary equipment was employed. The method resulted in a substantial decrease in the amount of dry carriers introduced as compared to the process of U.S. Pat. No. 5,596,815, as well as a substantial decrease in the amount of evaporated water in the drying process. A batch of 460 l of shredded raw food waste was prepared and mixed with a mechanical agitator in a 1,160 l mixer. For better mixing with the reagents, the raw food waste was diluted 30% by the process water. The addition of a 30% hydrated lime slurry in the dosage of 10 g/l provided pH adjustment to pH 8.0–9.0, which in turn provided enhanced flocculation. Bentonite in the dosage of 12 g/l (calculated relative to the amount of initial raw food waste) was introduced to the mixer. A 0.5% solution of the GRAS (generally recognized as safe) polymer 240G from Cytec Industries, Inc. was then introduced to the mixer. The dosage of the polymer was 1.9 kg per dry ton of the raw food waste. The processed admixture was dewatered in the screw press, resulting in the dewatered product moisture of 68%. Additional moisture reduction was provided by addition of a relatively small amount of an appropriate dry carrier.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A process for producing animal feed from food waste, consisting essentially of the steps of:
   (a) shredding of the food waste, resulting in ground food waste;
   (b) thickening of the ground food waste through the use of an amount, effective for the purpose, of an agglomerating polymer and a synthetic organic flocculant, resulting in a low moisture product and a separate liquid phase;
   (c) adding a dry carrier to the thickened ground food waste, followed by extrusion of the thickened ground food waste and evaporation of residual moisture to produce dried food pellets; and
   (d) treating the liquid phase so as to provide a high purity effluent for recycling.

2. The process as recited in claim 1, wherein the agglomerating polymer is selected from the group consisting of an organic cationic polyamine and a polyDADMAC flocculant.

3. The process as recited in claim 1, wherein the food waste is ground to less than 6 millimeters.

4. The process as recited in claim 1, wherein said ground food waste provides sufficient contact area for subsequent processing.

5. The process as recited in claim 1, wherein the synthetic organic flocculant is an anionic flocculant.

6. The process as recited in claim 1, wherein the anionic flocculant is a high molecular weight polyacrylamide GRAS series.

7. The process as recited in claim 1, wherein the dry carrier is selected from the group consisting of millfeed and bakery products.

8. A process for producing animal feed from food waste, comprising the steps of:
   (a) shredding of the food waste, resulting in ground food waste;
   (b) thickening of the ground food waste through the use of an amount, effective for the purpose, of an agglomerating polymer and a synthetic organic flocculant, resulting in a low moisture product and a separate liquid phase;
   (c) adding a dry carrier to the thickened ground food waste, followed by extrusion of the thickened ground food waste and evaporation of residual moisture to produce dried food pellets; and
   (d) treating the liquid phase so as to provide a high purity effluent for recycling, wherein the pH of the process is about 8–9.

9. The process as recited in claim 8, wherein the agglomerating polymer is selected from the group consisting of an organic cationic polyamine and a polyDADMAC flocculant.

10. The process as recited in claim 8, wherein the food waste is ground to less than 6 millimeters.

11. The process as recited in claim 8, wherein said ground food waste provides sufficient contact area for subsequent processing.

12. The process as recited in claim 8, wherein the synthetic organic flocculant is an anionic flocculant.

13. The process as recited in claim 8, wherein the anionic flocculant is a high molecular weight polyacrylamide GRAS series.

14. The process as recited in claim 8, wherein the dry carrier is selected from the group consisting of millfeed and bakery products.

* * * * *